Oct. 25, 1932.  G. F. NYE  1,884,153

CENTRIFUGAL THRESHING AND SEPARATING DEVICE

Filed Jan. 22, 1931

INVENTOR
George Francis Nye
BY
Thos. E. Scofield
ATTORNEY

Patented Oct. 25, 1932

1,884,153

UNITED STATES PATENT OFFICE

GEORGE FRANCIS NYE, OF KEARNEY, NEBRASKA

CENTRIFUGAL THRESHING AND SEPARATING DEVICE

Application filed January 22, 1931. Serial No. 510,470.

This invention relates to combined threshing and separating machines and is adapted for use in threshing all types of grain to eliminate the chaff, straw and dirt from the grain kernels.

The novelty lies primarily in the mounting on a single shaft of a threshing element, an air blast fan for drawing the grain through the threshing element, and a counter air blast fan for separating the chaff and straw from the grain kernels. Further novelty resides in the mounting of the two fans on opposite sides of a single disk and the threshing element substantially integral with the two fans to produce a compact, rigid unit.

Figure 2:
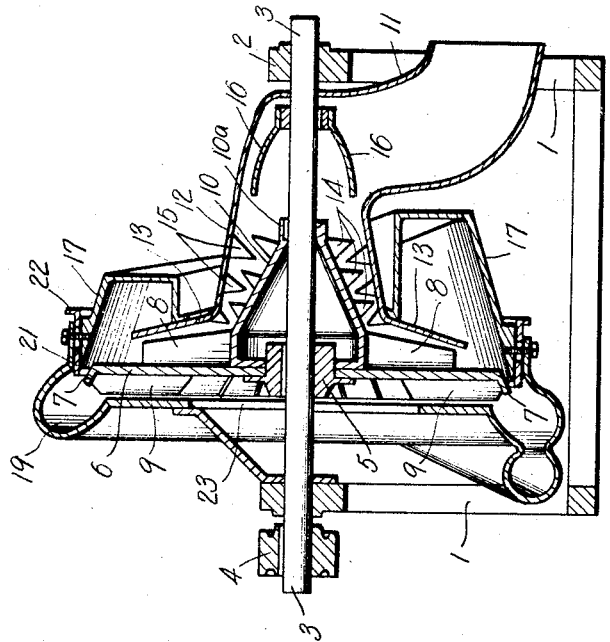
Fig. 2 is a sectional view of the mechanism of the machine shown in Fig. 1.
Figure 1:
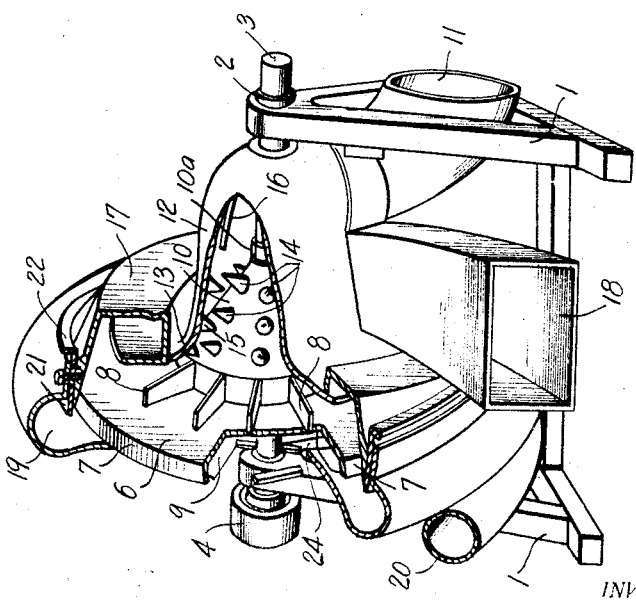
Fig. 1 is a perspective view of the machine with parts broken away.

Referring to the drawing, on any suitable type of standard such as that shown at 1, are mounted bearings 2 which support a shaft 3. This shaft may be direct-connected to a source of power such as a motor or internal combustion engine, or it may be driven by means of a pulley 4 from a portable power source not shown.

The shaft 3 carries a hub 5 to which is affixed a plate or disk 6. This disk is flanged at its circumference as shown at 7. On one side of the disk 6 is a plurality of fan blades 8 and a second set of fan blades 9 on the opposite sides of the disk. Adjacent to the disk is a cone 10 also carried by the shaft 3, one end of the cone abutting against the disk 6 and the opposite end tapered to terminate in a narrow hub portion designated as 10$^a$.

The crop is introduced to the machine through an inlet pipe 11. This inlet pipe is curved in the direction of the axis of the shaft to form a conical shaped housing 12. This housing terminates in a funnel-shaped mouth 13 which lies adjacent to the fan blades 8. On the exterior of the cone 10 are threshing pins 14 which are staggered with similar pins 15 on the interior of the housing placed in a reverse direction so that the grain passing between the pins will be torn apart and the chaff and straw separated from the kernels. A feeder 16 is mounted on the shaft 3 in the throat of the inlet pipe 11. This prevents clogging, packing or twisting of the straw around the shaft and assures a more positive feed to the threshing element.

Surrounding the funnel-shaped end of the housing 13 is a volute 17 which terminates in a chaff and straw discharge pipe 18. Similarly, at the peripheral edge of the disk 7 is a volute chamber 19 which terminates in a grain discharge pipe 20. Adjacent the flanged end 7 of the disk 6 is a cylindrical band 21 which is flanged at 22 to increase its rigidity and to permit adjustment in a direction parallel to the axis of the shaft 3. By moving this circular band in one direction the annular grain discharge passageway 23 may be enlarged or constricted to regulate the relative pressures existing in the grain volute 19 and the chaff and straw discharge volute 17.

The grain discharge passageway 23 is preferably a neutral zone through which the grain is discharged by centrifugal force imparted by the fan blades 8. In case a small amount of chaff and straw is being discharged with the grain into the grain discharge volute or some of the grain into the chaff and straw volute, by adjustment of the circular plate a more accurate separation is produced due to the differential air pressures in the grain volute and the chaff and straw volute. Under certain conditions it is preferable to have the counter blast set up by the fan blades 9 in excess of the pressure created by the fan 8 which discharges the chaff and straw. In such case the counter blast set up by the fan 9 will pass through the grain discharge port 23 in an opposed direction to the grain, cleaning the grain of the lighter particles of dirt, chaff, straw, or other deleterious matter and combining with the air blast from the fan 8 to be finally discharged through the pipe 18. The major portion of the counter blast will normally pass out with the grain through the grain discharge pipe 20. The counter blast air carrying the grain is sufficient to transport it to any suitable collecting bin.

It is contemplated that this machine may be operated as a stationary threshing unit or mounted on a combined harvester as the threshing and separating element. Furthermore, it may be mounted with a power source in innumerable combinations where the power source may be used both to furnish power to the threshing and separating mechanism and also supply power for traction.

The inlet for the air supplied to the fan 8 is through the pipe 11 and it is discharged through the pipe 18. The air for the counter air blast is drawn through an inlet 23 at the opposite end of the housing and the discharge for the counter blast air passes out through the grain discharge pipe 20 and a portion through the passageway 23 into the discharge pipe 18 carrying off the chaff and straw.

While the machine is mounted in the drawings in a horizontal position, it is contemplated that the shaft may be positioned in a vertical direction or at any other suitable angle, as the forces which take effect upon the material passing through the machine are little affected by gravity.

Blue grass, millet, clover, oats, barley, wheat or even beans can be handled by this type of machine, and the straw or vines effectively separated from the heavier kernels.

I claim as my invention:

1. A threshing machine comprising in combination a housing, a shaft rotatably mounted therein, a threshing means mounted on said shaft for rotation therewith, coacting threshing means mounted on said casing, a centrifugal impeller disk mounted on said shaft for rotation therewith adapted to throw the threshed mass outwardly by centrifugal force, blower fan blades mounted on one side of said disk for rotation therewith adapted to set up an air blast over the periphery of said disk of sufficient force to overcome the centrifugal momentum imparted to the chaff while insufficient to affect the grain, a chaff collecting channel formed in said housing and a grain collecting channel formed in said housing, said channels being provided with respective outlets for the chaff and the grain.

2. A centrifugal threshing machine including in combination a housing, a rotatable shaft, a threshing element, a disk, a fan intermediate the disk and threshing element, said threshing element, disk and fan mounted on said rotatable shaft and enclosed in said housing and a chaff and straw discharge on one side of the disk, a grain discharge on the opposite side of the disk, said disk and said housing forming an annular grain passageway at the circumference of the disk through which the threshed grain passes to the grain discharge.

3. A centrifugal threshing machine including in combination a housing, a rotatable shaft, a threshing element, a disk, a fan intermediate the disk and threshing element, said threshing element, disk and fan mounted on said rotatable shaft and enclosed in said housing, a chaff and straw discharge on one side of said disk, a grain discharge on the opposite side of said disk and an adjustable element carried by said housing, said disk and said adjustable element forming an annular grain passageway adjustable as to width at the circumference of the disk, through which the threshed grain passes to grain discharge.

4. A threshing machine as in claim 1 in which said disk is provided on its other side with fan blades for drawing in the material to be threshed and augmenting the centrifugal impelling effect of said disk.

5. A threshing machine as in claim 1 in which said channels are formed with a progressively increasing cross sectional area.

6. A threshing machine as in claim 1 in which said housing is provided with a crop inlet duct, means mounted on said shaft for rotation therewith adapted to agitate the incoming crop before its passage to said threshing means.

7. In a threshing machine as in claim 1, a cylindrical member adjustably mounted on said housing, a portion of said cylindrical member adapted to form a grain passageway with the periphery of said impeller disk, and means for immobilizing said cylindrical member when in adjusted position.

In testimony whereof I affix my signature.

GEORGE FRANCIS NYE.